United States Patent Office 3,122,532
Patented Feb. 25, 1964

3,122,532
MONOAZO DYESTUFFS
Meinrad Hürbin and Guido Schetty, both of Basel, Switzerland, assignors to J. R. Geigy A.-G., Basel, Switzerland
No Drawing. Filed Oct. 10, 1961, Ser. No. 144,023
Claims priority, application Switzerland Oct. 11, 1960
5 Claims. (Cl. 260—199)

The present invention concerns new monoazo dyestuffs, processes for the production thereof as well as their use for the dyeing of keratin material, in particular, of wool. The invention also concerns, as industrial product, the materials dyed with the aid of these dyestuffs.

Monoazo dyestuffs obtained from diazotised aminophenoxybenzene compounds the phenoxy radical of which contains an aliphatic, cycloaliphatic, araliphatic or aromatic radical having at least 4 carbon atoms, and 1-acylamino-8-hydroxynaphthylene sulphonic acids as coupling components have already been described. These dyestuffs dye wool in fast red shades.

It has now been found that monoazo dyestuffs having greatly increased wet fastness properties and also improved fastness to light are obtained if a diazotised aminophenoxybenzene compound, the phenoxy radical of which is substituted by an aliphatic, cycloaliphatic, araliphatic or aromatic radical having at least 4 carbon atoms and the benzene nuclei of which can contain further non-ionogenic substituents, is coupled in a weakly acid, neutral or weakly alkaline medium with a coupling component of the general Formula I

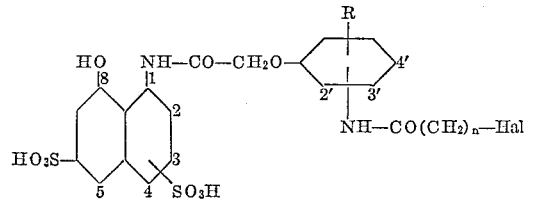

wherein
R represents hydrogen or the methyl group,
Hal represents halogen, particularly chlorine, and
$n$ is 1 or 2.

The new monoazo dyestuffs correspond to the general Formula II

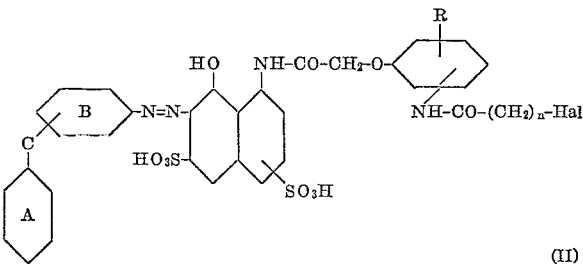

in which the benzene nucleus A is substituted by at least one aliphatic, cycloaliphatic, araliphatic or aromatic radical containing at least 4 carbon atoms and in which the benzene nuclei A and B can contain further non-ionogenic substituents, R is hydrogen or the methyl group, Hal is halogen and $n$ is 1 or 2.

Examples of the radical containing at least 4 carbon atoms in the aminophenoxybenzene compounds used according to the invention are butyl, amyl, hexyl or octyl groups, the cycloaliphatic radical is principally the cyclohexyl group and mainly the benzyl group is used as araliphatic radical and the phenyl group is aromatic radical. This radical containing at least 4 carbon atoms is advantageously in the p-position to the phenoxy group.

The aminophenoxy benzene compounds used as diazo components according to the invention can contain, as further nonionogenic substituents, for example low alkyl groups such as methyl, ethyl or propyl groups, low alkoxy groups such as methoxy or ethoxy groups, halogens such as fluorine, chlorine or bromine, nitro groups, sulphonyl groups such as methylsulphonyl, ethylsulphonyl, propylsulphonyl or phenylsulphonyl groups, sulphonic acid amide or sulphonic acid ester groups or carboxylic acid amide groups or nitrile groups.

The diazotised aminophenoxybenzene compounds are coupled with the coupling components of general Formula I by the usual methods, preferably in an acetic acid medium and the monoazo dyestuffs so formed according to the invention are isolated in the form of their alkali metal salts, in particular in the form of the sodium salts. Aminophenoxybenzene compounds having the phenoxy radical in o- or p-position to the amino group, are preferred.

Examples of aminophenoxybenzene compounds which can be used according to the invention are:

2-, 3- or 4-amino-1-(2'-, 3'- or 4'-n-butyl-phenoxy)-benzene,
2-, 3- or 4-amino-1-(2'-, 4'-di-n-butyl-phenoxy)-benzene,
2-, 3- or 4-amino-1-(2'-methyl-4'-n-butyl-phenoxy)-benzene,
2-, 3- or 4-amino-1-(2'- or 4'-isobutyl-phenoxy)-benzene,
2-, 3- or 4-amino-1-(4'-tert. butyl-phenoxy)-benzene,
2-, 3- or 4-amino-1-(2'-methyl-4'-tert. butyl-phenoxy)-benzene,
2-, 3- or 4-amino-1-(4'-amyl-phenoxy)-benzene,
2-, 3- or 4-amino-1-(2'-methyl-4'-amyl-phenoxy)benzene,
2-, 3- or 4-amino-1-(4'-n-hexyl-phenoxy)-benzene,
2-, 3- or 4-amino-1-(4'-octyl-phenoxy)-benzene,
2-, 3- or 4-amino-1-(4'-cyclohexyl-phenoxy)-benzene,
2-, 3- or 4-amino-1-(4'-benzyl-phenoxy)-benzene,
2-, 3- or 4-amino-1-(4'-o-chlorobenzyl-phenoxy)-benzene,
2-, 3- or 4-amino-1-(4'-m-chlorobenzyl-phenoxy)-benzene,
2-, 3- or 4-amino-1-(4'-p-chlorobenzyl-phenoxy)-benzene,
2-, 3- or 4-amino-1-(2'- or 4'-phenyl-phenoxy)-benzene,
2-, 3- or 4-amino-1-(4'-isoamyl-phenoxy)benzene,
2-amino-4- or -5-methyl-1-(2'- or 4'-amyl-phenoxy)-benzene,
2-amino-4,5-dimethyl-1-(2'- or 4'-amyl - phenoxy) - benzene,
2-amino-4- or -5-chloro-1-(2'- or 4'-amyl-phenoxy)-benzene, or
2-amino-4,5-dichloro-1-(2'- or 4'-amyl - phenoxy) - benzene.

Those aminophenoxybenzene compounds are preferred which have the phenoxy radical in o- or p-position to the amino group.

The coupling components of Formula I are obtained, for example, by reacting 1-amino-8-hydroxy-3,6- or -4,6-disulphonic acid with a compound of the general Formula III

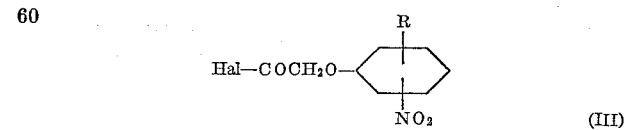

wherein R and Hal have the meanings given above, the reaction being performed advantageously in aqueous-organic solution at a pH of about 4.5, possibly in the presence of a buffer salt, advantageously an alkali metal salt of a low fatty acid, in particular sodium acetate, then reducing the nitro group to the amino group and reacting, advantageously under the conditions mentioned for the first step, with a halogen fatty acid halide of the general Formula IV

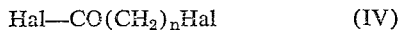
$$Hal-CO(CH_2)_nHal \qquad (IV)$$

wherein Hal and $n$ have the meanings given above.

Those coupling components are preferred which contain a halogen acylamino group in an m-position and possibly the methyl group in p-position of the phenoxy radical and which also contain the sulphonic acid groups in the 4,6-position of the naphthalene ring.

Particularly good dyestuffs are those having the general formula

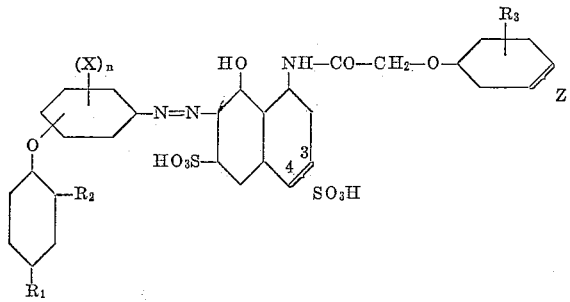

in which:

$R_1$ represents an alkyl group having 4 to 8 carbon atoms, phenyl, benzyl or a cyclohexyl group, $R_2$ represents hydrogen or the methyl group, $R_3$ represents hydrogen or the methyl group which is bound in a position meta, para or ortho to the O-linkage, X represents chlorine or the methyl radical, $n$ represents an integer from 0 to 2 inclusive, Z represents a chloroacetylamino or a bromoacetylamino group which is bound in meta- or para-position to the O linkage and the second sulphonic acid group of the naphthalene nucleus is in 3- or 4-position.

Of the foregoing particularly good dyestuffs, the monoazo dyestuffs having the general formula

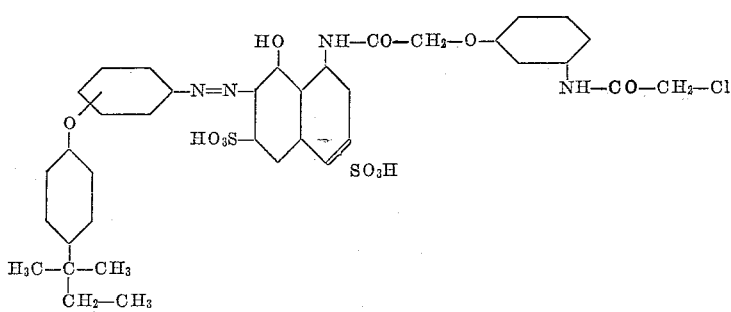

are especially valuable.

The new monoazo dyestuffs dye fibres containing nitrogen principally keratin fibres, particularly wool, but also silk, or leather, from a neutral, but mainly from a weakly acid bath in level red shades. These dyestuffs may possibly be mixed with slight amounts of basic salts, in particular with alkali phosphates such as, e.g. trisodium phosphate or tetrasodium pyrophosphate or with wetting agents having a dispersing action such as, e.g. higher alkyl-aryl sulphonates or polyalkyleneoxy-fatty acid condensation products to improve the water solubility.

The wool dyeings attained with the new monoazo dyestuffs differ from those of similar known monoazo dyestuffs in their better wet fastness properties, in particular their fastness to washing, milling and sea water. They also have increased fastness to light and some of them have a more pure shade.

The following examples illustrate the invention. Where not otherwise stated, parts are given as parts by weight. The temperatures are in degrees centigrade. The relationship of parts by weight to parts by volume is as that of kilogrammes to litres.

EXAMPLE 1

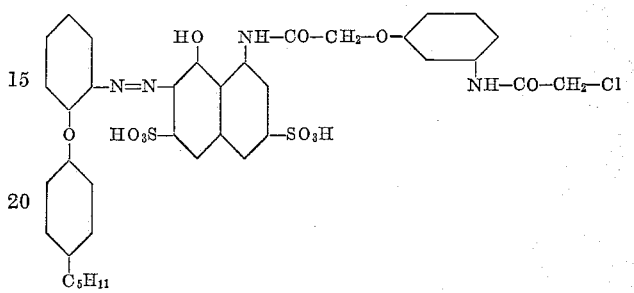

25.5 parts of 4'-tert. amyl-2-aminodiphenyl ether are dissolved in 120 parts of ethyl alcohol and 30 parts of concentrated hydrochloric acid and diazotized by the dropwise addition of a solution of 6.9 parts of sodium nitrite in 15 parts of water at 0–7°. The diazo solution so obtained is poured at 0–5° into a solution of the disodium salt of 54.45 parts of 1-[(3'-chloroacetylamino)-phenoxyacetylamino] - 8 - hydroxynaphthalene-3,6-disulphonic acid and 24 parts of sodium bicarbonate in 1800 parts of water. The whole is stirred for several hours, 12 parts of concentrated hydrochloric acid are added dropwise and the precipitated dyestuff is filtered off and dried. It is a red powder which dyes wool from a neutral to weakly acid bath in pure red shades which are fast to light, rubbing, and wet.

EXAMPLE 2

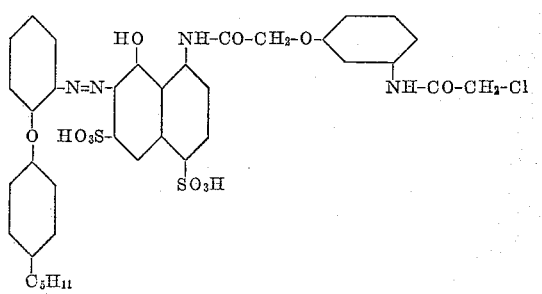

25.5 parts of 4'-tert. amyl-2-amino-diphenyl ether are dissolved in 120 parts of ethyl alcohol and 30 parts of concentrated hydrochloric acid, and diazotized by the dropwise addition, at 0–7°, of a solution of 6.9 parts of sodium nitrite in 15 parts of water. The diazo solution is poured at 0–5° into a solution of the disodium salt of 54.45 parts of 1-[(3'-chloroacetylamino)-phenoxyacetylamino]-8-hydroxynaphthalene-4,6-disulphonic acid and 22 parts of sodium carbonate in 1600 parts of water. The whole is stirred for several hours, 25 parts of concentrated hydrochloric acid are added, the precipitated dyestuff is filtered off and dried. It is a red powder which dissolves in hot water with a vivid red colour. It dyes wool from a neutral to weakly acid bath in pure red shades which are fast to light and rubbing and have excellent fastness to washing, milling and sea water.

Similar dyestuffs are obtained if, in the above example, 63.3 parts of the disodium salt of 1-[(3'-bromoacetylamino) - phenoxyacetylamino] - 8 - hydroxynaphthalene-4,6-disulphonic acid or 60.25 parts of the disodium salt of 1-[(3' - chloropropionylamino)-phenoxyacetylamino]-8-hydroxynaphthalene-4,6-disulphonic acid are used as coupling component.

EXAMPLE 3

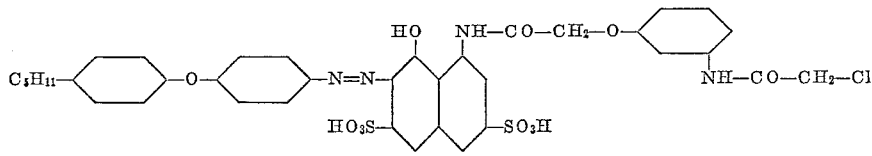

A solution of 6.9 parts of sodium nitrite in 16 parts of water is added dropwise at 3–7° to a solution of 25.5 parts of 4'-tert. amyl-4-aminodiphenyl ether in 100 parts of ethyl alcohol and 30 parts of concentrated hydrochloric acid. The diazo solution so obtained is poured at 0–5° into a solution of the disodium salt of 54.45 parts of 1-[(3'-chloroacetylamino)-phenoxyacetylamino]-8-hydroxynaphthalene-3,6-disulphonic acid and 28 parts of crystallised sodium acetate in 2000 parts of water. The whole is stirred for several hours, the precipitated dyestuff is filtered off and dried. It is a dark red powder which dyes wool from a neutral to weakly acid bath in pure blueish red shades which are fast to wet and light.

EXAMPLE 4

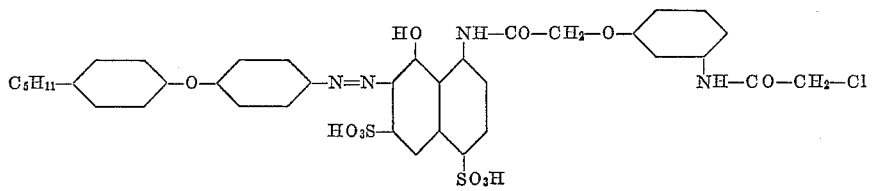

A solution of 6.9 parts of sodium nitrite in 16 parts of water is added dropwise at 3–7° to a solution of 25.5 parts of 4'-tert. amyl-4-aminodiphenyl ether in 120 parts of ethyl alcohol and 30 parts of concentrated hydrochloric acid. The diazo solution so obtained is poured at 0–5° into a solution of the disodium salt of 54.45 parts of 1 - [(3'-chloroacetylamino)-phenoxyacetylamino]-8-hydroxynaphthalene-4,6-disulphonic acid and 28 parts of crystallised sodium acetate in 2000 parts of water. The whole is stirred for several hours, 40 parts of sodium chloride are sprinkled in and the precipitated dyestuff is filtered off and dried. It is a dark red powder which dyes wool from a neutral to weakly acid bath in pure red shades which are fast to wet and light.

EXAMPLE 5

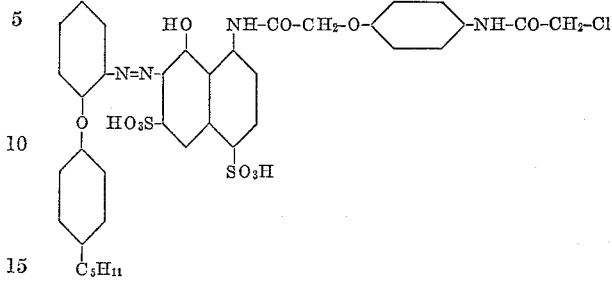

25.5 parts of 4'-tert. amyl-2-aminodiphenyl ether are dissolved in 120 parts of ethyl alcohol and 30 parts of concentrated hydrochloric acid and diazotised by the dropwise addition of a solution of 6.9 parts of sodium nitrite in 16 parts of water at 0–7°. The diazo solution so obtained is poured at 0–5° into a solution of the disodium salt of 54.45 parts of 1-[(4'-chloroacetylamino)-phenoxyacetylamino] - 8 - hydroxynaphthalene-4,6-disulphonic acid and 22 parts of sodium carbonate in 2000 parts of water. The whole is stirred for several hours, 25 parts of concentrated hydrochloric acid are added and the precipitated dyestuff is filtered off and dried. It is a red powder which dyes wool from a neutral to weakly acid bath in pure red shades which are fast to light and wet.

EXAMPLE 6

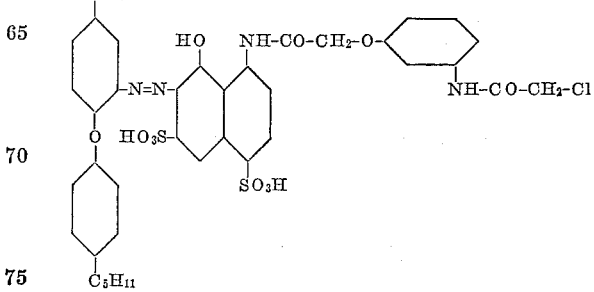

26.9 parts of 4'-tert. amyl-4-methyl-2-aminodiphenyl ether are dissolved in 150 parts of ethyl alcohol and 30 parts of concentrated hydrochloric acid and a solution of 6.9 parts of sodium nitrite in 16 parts of water is slowly added dropwise at 0–7° while stirring. The diazo solution so obtained is poured at 0–5° into a solution of the disodium salt of 54.45 parts of 1-[(3'-chloroacetylamino)-phenoxyacetylamino] - 8 - hydroxynaphthalene-4,6-disulphonic acid and 28 parts of crystallised sodium acetate in 2000 parts of water. The whole is stirred for several hours, then 60 parts of sodium chloride are sprinkled in, the precipitated dyestuff is filtered off and then dried. It is a red powder which dyes wool from a neutral to weakly acid bath in pure red shades which are fast to wet and light.

EXAMPLE 7

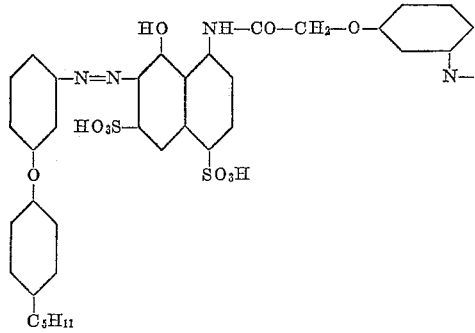

25.5 parts of 4'-tert. amyl-3-aminodiphenylether are dissolved in 120 parts of ethyl alcohol and 30 parts of concentrated hydrochloric acid and diazotised by the dropwise addition of a solution of 6.9 parts of sodium nitrite in 16 parts of water at 0–7°. The diazo solution so obtained is poured at 0–5° into a solution of the disodium salt of 54.45 parts of 1-[(3'-chloroacetylamino)-phenoxyacetylamino]-8-hydroxynaphthalene-4,6-disulphonic acid and 30 parts of crystallised sodium acetate in 1800 parts of water. The whole is stirred for several hours, 60 parts of sodium chloride are sprinkled in and the precipitated dyestuff is filtered off and dried. It dyes wool from a neutral to weakly acid bath in pure red shades which are fast to wet and light.

EXAMPLE 8

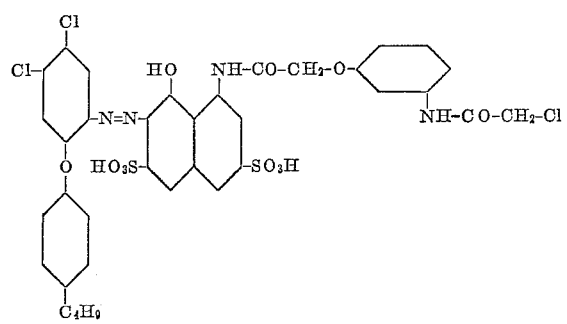

31 parts of 4'-butyl-4,5-dichloro-2-aminodiphenyl ether are dissolved in 200 parts of ethyl alcohol and 30 parts of concentrated hydrochloric acid and diazotised by the dropwise addition of a solution of 6.9 parts of sodium nitrite in 16 parts of water at 0–7°. The diazo solution is poured at 0–5° into a solution of the disodium salt of 54.45 parts of 1-[(3'-chloroacetylamino)-phenoxyacetylamino]-8-hydroxynaphthalene-3,6-disulphonic acid and 30 parts of crystallised sodium acetate in 2000 parts of water. The whole is stirred for several hours, heated to 60° and 100 parts of sodium chloride are sprinkled in. The precipitated dyestuff is filtered off and dried. It is a red powder which dyes wool from a neutral to weakly acid bath in pure bluish red shades which are fast to wet and light.

EXAMPLE 9

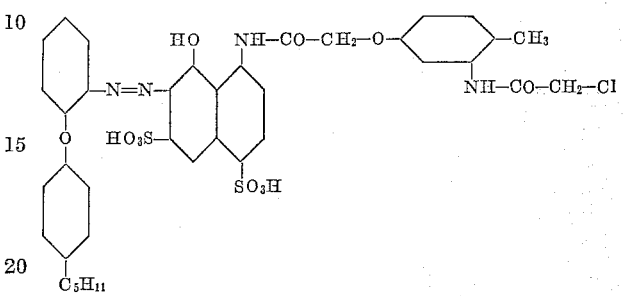

25.5 parts of 4'-tert. amyl-2-aminodiphenyl ether are dissolved in 120 parts of ethyl alcohol and 30 parts of concentrated hydrochloric acid and diazotised by the dropwise addition of a solution of 6.9 parts of sodium nitrite in 15 parts of water at 0–7°. The diazo solution so obtained is poured at 0–5° into a solution of the disodium salt of 55.85 parts of 1-[(3'-chloroacetylamino-4'-methyl)-phenoxyacetylamino] - 8 - hydroxynaphthalene - 4,6 - disulphonic acid and 22 parts of sodium carbonate in 1600 parts of water. The whole is stirred for several hours, 25 parts of hydrochloric acid are poured in, the precipitated dyestuff is filtered off and dried. It is a red powder which dissolves in hot water with a vivid red colour and dyes wool from a neutral to weakly acid bath in pure red shades which are fast to light and rubbing and have excellent fastness to washing, milling and sea water.

EXAMPLE 10

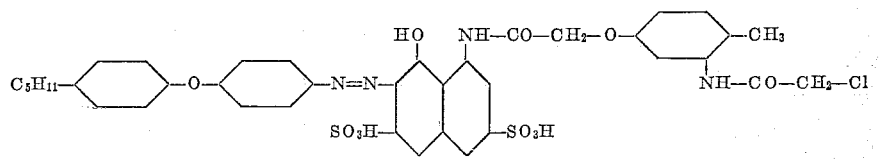

A solution of 6.9 parts of sodium nitrite in 16 parts of water is added dropwise at 3–7° to a solution of 25.5 parts of 4'-tert. amyl-4-aminodiphenyl ether in 100 parts of ethyl alcohol and 30 parts of concentrated hydrochloric acid. The diazo solution so obtained is poured at 0–5° into a solution of the disodium salt of 55.85 parts of 1-[(3'-chloroacetylamino - 4' - methyl)-phenoxyacetylamino]-8-hydroxynaphthalene-3,6-disulphonic acid and 28 parts of crystallised sodium acetate in 2000 parts of water. The whole is stirred for several hours and the precipitated dyestuff is filtered off and dried. It is a dark red powder and dyes wool from a neutral to weakly acid bath in pure blueish red shades which are fast to wet and light.

EXAMPLE 11

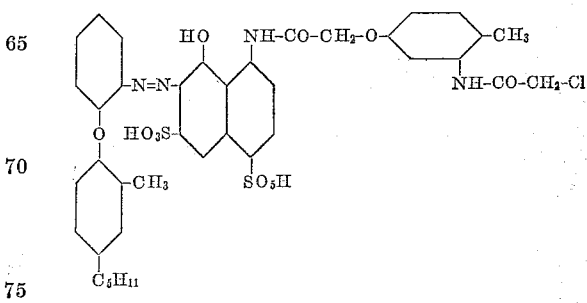

26.9 parts of 2'-methyl-4'-tert. amyl-2-amino-diphenyl ether are dissolved in 120 parts of ethyl alcohol and 30 parts of concentrated hydrochloric acid and diazotised by the dropwise addition at 0–7° of 6.9 parts of sodium nitrite in 15 parts of water. The diazo solution so obtained is poured at 0–5° into a solution of the disodium salt of 55.85 parts of 1-[(3'-chloroacetylamino-4'-methyl)-phenoxyacetylamino] - 8 - hydroxynaphthalene - 4,6 - disulphonic acid and 22 parts of sodium carbonate in 1600 parts of water. The whole is stirred for several hours, 25 parts of concentrated hydrochloric acid are added and the precipitated dyestuff is filtered off and dried. It is a red powder which dissolves in hot water with a vivid red colour and dyes wool from a neutral to weakly acid acid bath in pure red shades which are fast to light and rubbing.

A similar dyestuff is obtained if, in the above example, 25.5 parts of 2'-methyl-4'-tert. butyl-2-amino-diphenyl-ether are used as diazo component instead of 26.9 parts of 2'-methyl-4'-tert. amyl-2-amino-diphenyl ether.

Further dyestuffs are given in the following table which are obtained by the methods described in Examples 1 to 11.

Table

| No. | Diazo component | Azo component | Shade of wool dyeing |
|---|---|---|---|
| 1 | 4'-tert. amyl-2-amino-diphenyl ether. | 1-[(4'-bromoacetylamino)-phenoxyacetylamino]-8-hydroxynaphthalene-4,6-disulphonic acid. | Red. |
| 2 | 4'-tert. amyl-4-amino-diphenylether. | 1[(3'-bromoacetylamino)-phenoxyacetylamino]-8-hydroxynaphthalene-4,6-disulphonic acid. | Blueish red. |
| 3 | 4'-n-hexyl-2-amino-diphenyl ether. | 1-[(3'-chloroacetylamino)-phenoxyacetylamino]-8-hydroxynaphthalene-3,6-disulphonic acid. | Red. |
| 4 | ----do---- | 1[(3'-bromoacetylamino)-phenoxyacetylamino]-8-hydroxynaphthalene-3,6-disulphonic acid. | Do. |
| 5 | 4'-phenyl-2-amino-diphenyl ether. | 1-[(3'-bromoacetylamino)-phenoxyacetylamino]-8-hydroxynaphthalene-4,6-disulphonic acid. | Do. |
| 6 | ----do---- | 1-[(3'-chloroacetylamino)-phenoxyacetylamino]-8-hydroxynaphthalene-4,6-disulphonic acid. | Do. |
| 7 | 4'-octyl-2-aminodiphenyl ether. | ----do---- | Do. |
| 8 | ----do---- | 1-[(3'-bromoacetylamino)-phenoxyacetylamino]-8-hydroxynaphthalene-4,6-disulphonic acid. | Do. |
| 9 | 4'-benzyl-2-amino-diphenyl ether. | ----do---- | Do. |
| 10 | ----do---- | 1-[(3'-chloroacetylamino)-phenoxyacetylamino]-8-hydroxynaphthalene-4,6-disulphonic acid. | Do. |
| 11 | 4'-cyclohexyl-2-amino-diphenyl ether. | ----do---- | Do. |
| 12 | ----do---- | 1-[(3'-bromoacetylamino)-phenoxyacetylamino]-8-hydroxynaphthalene-4,6-disulphonic acid. | Do. |
| 13 | 4'-butyl-2-amino-diphenyl ether. | 1-[(3'-chloroacetylamino)-phenoxyacetylamino]-8-hydroxynaphthalene-4,6-disulphonic acid. | Do. |
| 14 | 4'-butyl-4,5-dichloro-2-aminodiphenyl ether. | ----do---- | Do. |
| 15 | 4'-butyl-4,5-dimethyl-2-aminodiphenyl ether. | ----do---- | Do. |
| 16 | 4'-tert.amyl-4-chloro-2-aminodiphenyl ether. | ----do---- | Do. |
| 17 | 4'-tert.amyl-4-methyl-2-aminodiphenyl ether. | 1-[(3'-chloroacetylamino)-phenoxyacetylamino]-8-hydroxynaphthalene-3,6-disulphonic acid. | Do. |
| 18 | 4'-tert.amyl-4,5-dimethyl-2-aminodiphenyl ether. | ----do---- | Do. |
| 19 | 4'-tert.amyl-3-amino-diphenyl ether. | ----do---- | Do. |
| 20 | 4'-tert.amyl-4-chloro-2-aminodiphenyl ether. | ----do---- | Do. |
| 21 | 2'-methyl-4'-tert.amyl 2-aminodiphenyl ether. | ----do---- | Do. |
| 22 | 4'-tert.amyl-4-amino-diphenyl ether. | 1-[(4'-chloroacetylamino)-phenoxyacetylamino]-8-hydroxynaphthalene-3,6-disulphonic acid. | Blueish red. |
| 23 | ----do---- | 1-[(3'-methyl-4'-chloroacetylamino)-phenoxyacetylamino]-8-hydroxynaphthalene-4,6-disulphonic acid. | Do. |
| 24 | ----do---- | 1-[(2'-methyl-4'-chloroacetylamino)-phenoxyacetylamino]-8-hydroxynaphthalene-4,6-disulphonic acid. | Do. |
| 25 | 4'-tert.amyl-2-aminodiphenyl ether. | ----do---- | Red. |
| 26 | ----do---- | 1-[(3'-methyl-4'-chloroacetylamino)-phenoxyacetylamino]-8-hydroxynaphthalene-4,6-disulphonic acid. | Do. |
| 27 | ----do---- | 1-[(3'-bromoacetylamino-4'-methyl)-phenoxyacetylamino]-8-hydroxynapthalene-4,6-disulphonic acid. | Do. |

EXAMPLE 12

100 parts of previously well wetted wool are entered at 50° into a dyebath containing 2 parts of the dyestuff obtained according to Example 2 and 6 parts of 30% acetic acid in 3000 parts of water. The bath is brought to the boil within 15 minutes and boiled for 45 minutes. The liquor is fully exhausted and a very pure red wool dyeing is obtained which is distinguished by good fastness to light and excellent wet fastness properties.

What we claim is:

1. The monazo dyestuff having the general formula

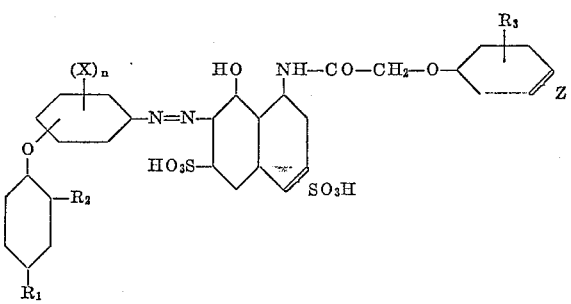

wherein:
 $R_1$ represents a member selected from the group consisting of alkyl having 4 to 8 carbon atoms, phenyl, benzyl and cyclohexyl,
 $R_2$ represents a member selected from the group consisting of hydrogen and methyl,
 $R_3$ represents a member selected from the group consisting of hydrogen and methyl,
 X represents a member selected from the group consisting of chlorine and methyl,
 n represents an integer from 0 to 2 inclusive, and
 Z represents a member selected from the group consisting of chloroacetylamino and bromoacetylamino groups.

2. The monoazo dyestuff having the general formula
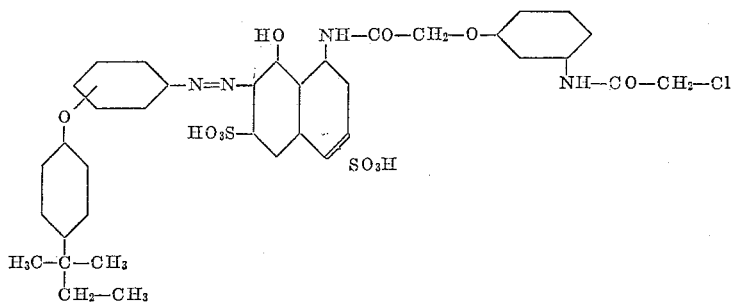
3. The monoazo dyestuff having the formula
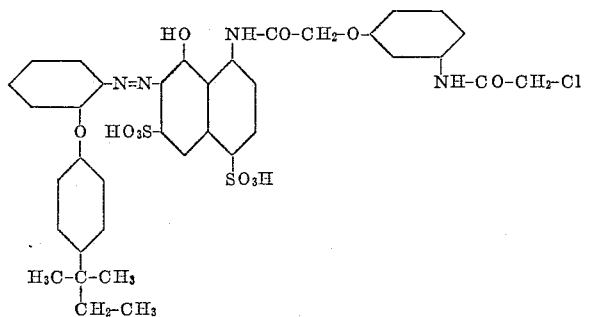
4. The monoazo dyestuff having the formula
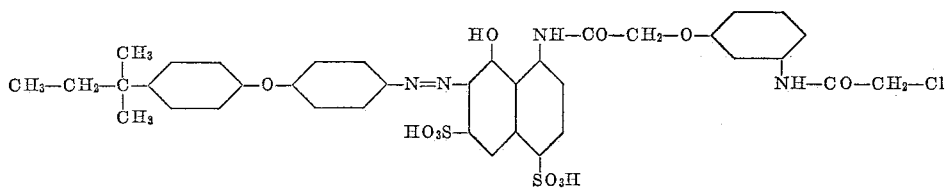
5. The monoazo dyestuff having the formula
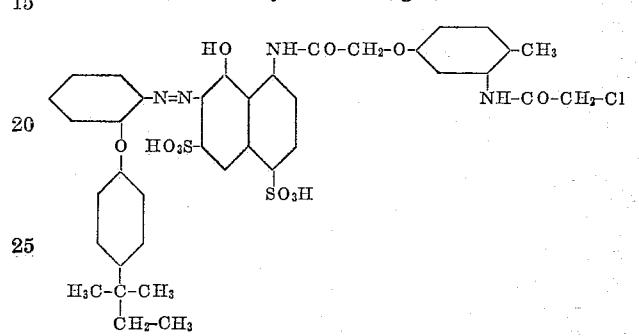
References Cited in the file of this patent
UNITED STATES PATENTS
| | | |
|---|---|---|
| 2,785,158 | Enders et al. | Mar. 12, 1957 |
| 2,975,167 | Schwander et al. | Mar. 14, 1961 |
OTHER REFERENCES
Wegmann: J. Textil-Praxis, October 1958, pages 1056–1061.